United States Patent
Ryu

(10) Patent No.: US 11,184,584 B2
(45) Date of Patent: Nov. 23, 2021

(54) METHOD FOR IMAGE DECODING, METHOD FOR IMAGE ENCODING, APPARATUS FOR IMAGE DECODING, APPARATUS FOR IMAGE ENCODING

(71) Applicant: GACHON UNIVERSITY OF INDUSTRY-ACADEMIC COOPERATION FOUNDATION, Seongnam-si (KR)

(72) Inventor: Eun-Seok Ryu, Seoul (KR)

(73) Assignee: GACHON UNIVERSITY OF INDUSTRY-ACADEMIC COOPERATION FOUNDATION, Seongnam-si (KR)

(*) Notice: Subject to any disclaimer, the term of this patent is extended or adjusted under 35 U.S.C. 154(b) by 97 days.

(21) Appl. No.: 16/313,546

(22) PCT Filed: Jun. 27, 2017

(86) PCT No.: PCT/KR2017/006778
§ 371 (c)(1),
(2) Date: Mar. 21, 2019

(87) PCT Pub. No.: WO2018/004239
PCT Pub. Date: Jan. 4, 2018

(65) Prior Publication Data
US 2020/0389621 A1    Dec. 10, 2020

(30) Foreign Application Priority Data
Jun. 27, 2016  (KR) .................. 10-2016-0080474

(51) Int. Cl.
H04N 7/15      (2006.01)
H04N 19/167    (2014.01)
H04N 19/70     (2014.01)

(52) U.S. Cl.
CPC ............. *H04N 7/15* (2013.01); *H04N 19/167* (2014.11); *H04N 19/70* (2014.11)

(58) Field of Classification Search
USPC ............................... 348/14.01, 14.02, 14.08
See application file for complete search history.

(56) References Cited

U.S. PATENT DOCUMENTS

2015/0023407 A1*  1/2015  Sato ............... H04N 19/55
                                          375/240.02
2015/0304665 A1* 10/2015  Hannuksela ...... H04N 13/161
                                          375/240.02
(Continued)

FOREIGN PATENT DOCUMENTS

JP   2016-510525      4/2016
KR   2011-0017337     2/2011
(Continued)

OTHER PUBLICATIONS

International Preliminary Report on Patentability PCT/KR2017/006778 dated Jan. 1, 2019.

*Primary Examiner* — Maria El-Zoobi
(74) *Attorney, Agent, or Firm* — Reches Patent

(57) ABSTRACT

An image decoding method includes: receiving a bitstream that includes video data and signaling data; decoding base layer video data; and decoding at least one enhancement layer video data based on the signaling data and the base layer video data, wherein the video data includes the base layer video data for a base layer and the at least one enhancement layer video data for at least one enhancement layer predicted from the base layer, wherein the signaling data includes region of interest information indicating a region of interest corresponding to a gaze direction of a user in an entire region of a virtual space for video conferencing service.

6 Claims, 16 Drawing Sheets

(56) References Cited

U.S. PATENT DOCUMENTS

| | | | | |
|---|---|---|---|---|
| 2015/0373341 A1* | 12/2015 | Davies | ................ | H04N 19/103 375/240.02 |
| 2017/0094184 A1* | 3/2017 | Gao | ..................... | G01S 3/7864 |
| 2017/0347084 A1* | 11/2017 | Boyce | ..................... | G06F 3/013 |

FOREIGN PATENT DOCUMENTS

| | | |
|---|---|---|
| KR | 2011-0019955 | 3/2011 |
| KR | 2014-0082540 | 7/2014 |
| KR | 10-2014-0115354 | 9/2014 |

* cited by examiner

SPEAKER AND GAZE DETERMINATION

METHOD FOR IMAGE DECODING, METHOD FOR IMAGE ENCODING, APPARATUS FOR IMAGE DECODING, APPARATUS FOR IMAGE ENCODING

TECHNICAL FIELD

The present invention relates to an image decoding method, an image encoding method, an image decoding device, and an image encoding device for processing an image in consideration of visual information.

BACKGROUND ART

Recently, with the development of Virtual Reality (VR) technology and equipment, many companies have introduced devices that may be worn on the body, such as a head-mounted display (HMD). Service scenarios through the HMD may include movie viewing, games, remote surgery, and video conferencing.

Among these, a video conferencing service photographs a conference participant located at a remote place using a general camera or Immersive Camera equipment, and transmits it to a video conferencing system and maps it to a virtual space area.

Currently, this service has the traditional problems that occur when the bandwidth difference, the delay, the jitter, and the error rate of the data sent by several users are different from each other. In particular, since the HMD provides a close-up display, a high-quality image must be provided to the user. However, since the video conferencing system and/or the HMD performs the same image processing on a portion not viewed by the user's eyes, this causes problems of limited bandwidth and processing performance.

For example, since the HMD may cause considerable inconvenience to the user when the image resolution is low, the HMD has to maintain high resolution, but it is not easy to implement. In addition, the HMD quickly receives large amounts of data, which are images of several persons, and processes them rapidly but it is not easy to implement them.

DISCLOSURE OF THE INVENTION

Technical Problem

An object of the present invention is to provide a method and device for differently processing screen quality viewed according to a user's gaze.

In addition, an object of the present invention is to provide a method for promptly responding to changes in the user's gaze.

In addition, an object of the present invention is to provide a signaling method for effectively responding to changes in the user's gaze.

Technical Solution

According to an embodiment of the present invention, an image decoding method includes: receiving a bitstream that includes video data and signaling data; decoding base layer video data; and decoding at least one enhancement layer video data based on the signaling data and the base layer video data, wherein the video data includes the base layer video data for a base layer and the at least one enhancement layer video data for at least one enhancement layer predicted from the base layer, wherein the signaling data includes region of interest information indicating a region of interest corresponding to a gaze direction of a user in an entire region of a virtual space for video conferencing service.

According to another embodiment of the present invention, an image encoding method includes: generating base layer video data; generating at least one enhancement layer video data based on signaling data and the base layer video data; and generating a bitstream that includes video data and the signaling data, wherein the video data includes the base layer video data for a base layer and at least one enhancement layer video data for at least one enhancement layer predicted from the base layer, wherein the signaling data includes region of interest information indicating a region of interest corresponding to a gaze direction of a user in an entire region of a virtual space for video conferencing service.

According to another embodiment of the present invention, an image decoding device includes: an extractor configured to receive a bitstream including video data and signaling data; a base layer decoder configured to decode base layer video data; and an enhancement layer decoder configured to decode at least one enhancement layer video data based on the signaling data and the base layer video data, wherein the video data includes the base layer video data for a base layer and the at least one enhancement layer video data for at least one enhancement layer predicted from the base layer, wherein the signaling data includes region of interest information indicating a region of interest corresponding to a gaze direction of a user in an entire region of a virtual space for video conferencing service.

According to another embodiment of the present invention, an image encoding device includes: a base layer encoder configured to generate base layer video data; an enhancement layer encoder configured to generate at least one enhancement layer video data based on signaling data and the base layer video data; and a multiplexer configured to generate a bitstream including video data and the signaling data, wherein the video data includes the base layer video data for a base layer and the at least one enhancement layer video data for at least one enhancement layer predicted from the base layer, wherein the signaling data includes region of interest information indicating a region of interest corresponding to a gaze direction of a user in an entire region of a virtual space for video conferencing service.

Advantageous Effects

The present invention minimizes the change in image quality felt by the wearer of the HMD based on the user's gaze, and has the effects of saving bandwidth (BW) for image transmission and reducing power consumption by improving image processing performance.

MODE FOR CARRYING OUT THE INVENTION

Figure 1:
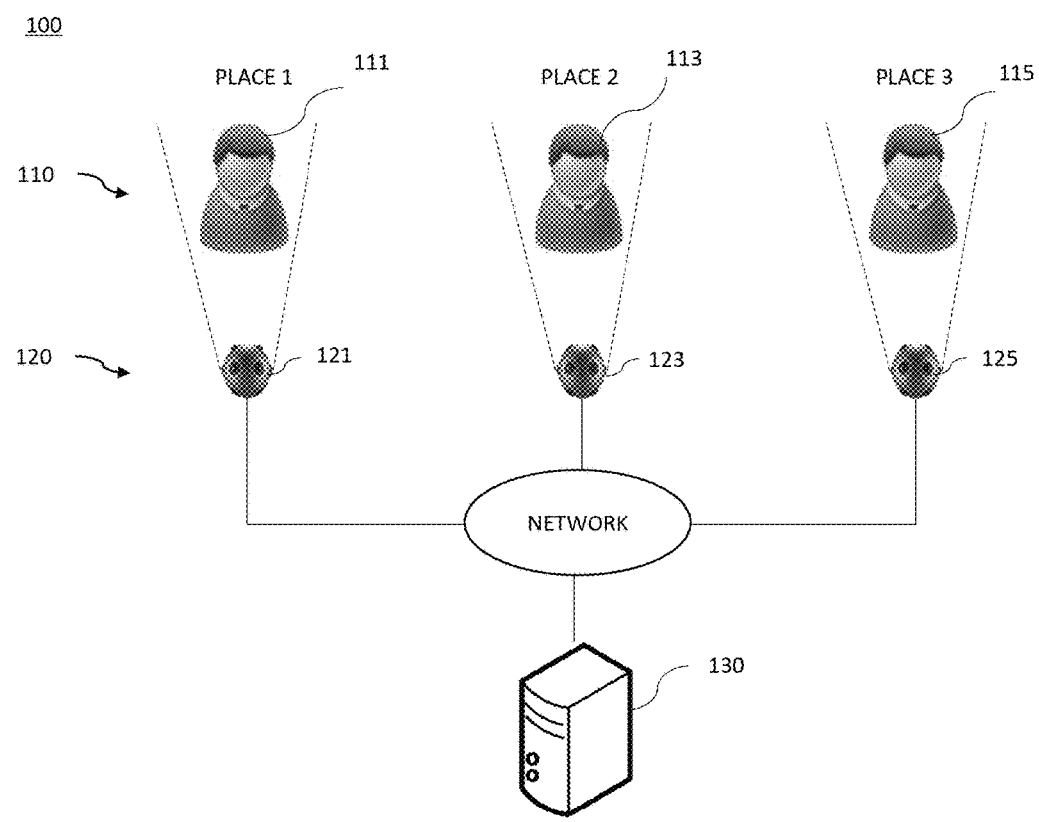
FIG. 1 is a diagram illustrating a video conferencing system according to an embodiment of the present invention.

It should be noted that the technical terms used herein are used only to describe certain embodiments and are not intended to limit the technical scopes disclosed herein. Also, unless otherwise particularly defined in this specification, technical terms used herein should be interpreted as being generally understood by those skilled in the art and should not be interpreted in an overly broad sense or an overly reduced sense. Further, when the technical terms used herein are erroneous technical terms that do not accurately express the technical ideas disclosed herein, they should be understood by replacing with technical terms understood by those skilled in the art to which the presently disclosed techniques belong. Also, the generic terms used herein should be interpreted according to context, and should not be construed as being excessively reduced in meaning.

Terms including ordinals, such as first, second, etc., used herein may be used to describe various elements, but the elements should not be limited by those terms. The above terms are used only to distinguish one component from another. For example, a first component may be referred to as a second component and vice versa without departing from the technical scope of the present invention.

Hereinafter, embodiments of the present invention are described in more detail with reference to accompanying drawings and regardless of the drawings symbols, same or similar components are assigned with the same reference numerals and thus overlapping descriptions for those are omitted.

In describing techniques disclosed herein, if it is determined that detailed descriptions of related known techniques obscure technical points, the detailed description will be omitted. Furthermore, it should be noted that the attached drawings are used to help easily understanding the technical ideas disclosed herein and should not be construed as limiting the technical ideas.

FIG. 1 is a diagram illustrating a video conferencing system according to an embodiment of the present invention.

A video conferencing system according to an embodiment of the present invention may provide a video conferencing service to at least one user located at a remote location. A video conferencing service is a service that enables people in different regions to meet each other face-to-face without having to meet each other directly.

The video conferencing system may be configured in two ways. First, the video conferencing system may be achieved by direct N:N communication between client devices (for example, HMDs) of each user. In this case, since several signaling and video transmission are performed, respectively, although the total bandwidth is high, the video conferencing system may provide optimal image for each user.

Second, the video conferencing system may further include a server device (or relay system) for video conferencing. In this case, the server device receives at least one video image from each client device, and collects/selects at least one video image, and thus may serve as each client device.

One embodiment of the present invention may be applied to both of the above video conferencing systems, and the following description will focus on the second embodiment.

A video conferencing system 100 according to an embodiment of the present invention may include at least one client device 120 and/or a server device 130 for at least one user 110 at a remote location.

The client device 120 may obtain the user data from the user 110 using the corresponding client device 120. The user data may include user image data, voice data, and additional data.

For example, the client device 120 may include at least one of a 2D/3D camera and an Immersive camera for obtaining image data of the user 110. The 2D/3D camera may capture an image having a viewing angle of 180 degrees or less. The immersive camera may capture an image having a viewing angle of 360 degrees or less.

For example, the client device 120 may include at least one of a first client device 121 for obtaining user data of a first user 111 located at a first place Place 1, a second client device 123 for obtaining user data of a second user 113 located at a second place Place 2, and a third client device 125 for obtaining user data of a third user 115 located at a third place Place 3.

Then, each client device 120 may transmit the obtained user data to the server device 130 through the network.

The server device 130 may receive at least one user data from the client device 120. The server device 130 may generate a full image for video conference in the virtual space based on the received user data. The full image may represent an immersive image providing a 360-degree image within the virtual space. The server device 130 may generate a full image by mapping the image data included in the user data into the virtual space.

Then, the server device 130 may transmit a full image to each user.

Each client device 120 may receive a full image and render and/or display as much as the area that each user sees in the virtual space.

Figure 2:
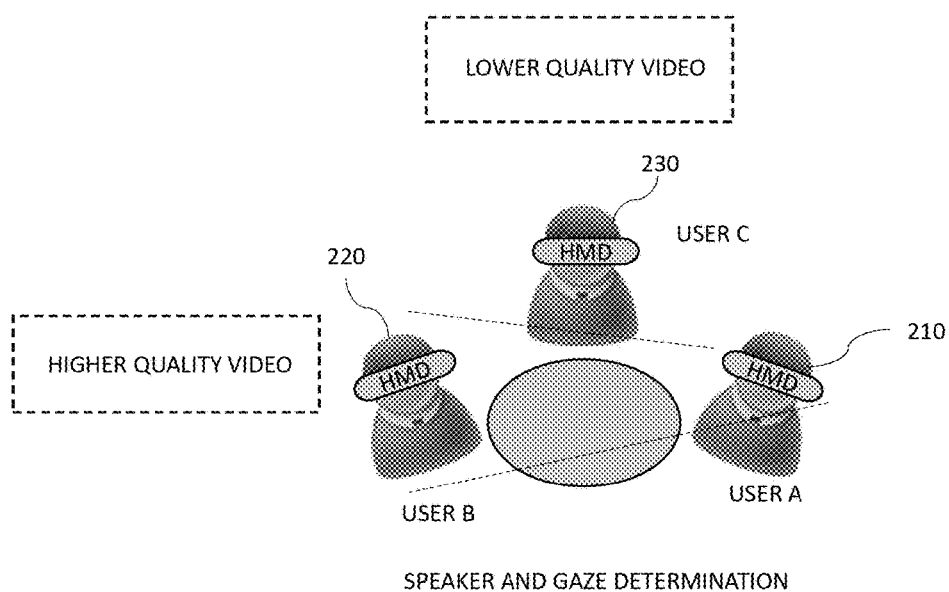
FIG. 2 is a diagram illustrating a video conferencing service according to an embodiment of the present invention.

FIG. 2 is a diagram illustrating a video conferencing service according to an embodiment of the present invention.

Referring to the drawing, a first user 210, a second user 220, and a third user 230 may exist in the virtual space. The first user 210, the second user 220, and the third user 230 may perform a conference while looking at each other in the virtual space. Hereinafter, the first user 210 will be mainly described.

The video conferencing system according to an embodiment of the present invention may determine the gaze of the speaker and/or the first user 210 speaking in the virtual space. For example, the second user 220 may be a speaker and the first user 210 may view the second user.

In this case, the video conferencing system may transmit the image of the second user 220 viewed by the first user 210 to the first user 210 as a high-quality video image. In addition, the video conferencing system may transmit the image of the third user 230, which is not visible or partially visible in the gaze direction of the first user 220, to the first user 210 as a low quality video image.

As a result, compared with the conventional method of transmitting all full images as high quality video images, the video conferencing system according to an embodiment of the present invention may reduce the bandwidth (BW) for image transmission and improve the image processing performance by differentiating the image processing method based on the user's gaze.

Figure 3:
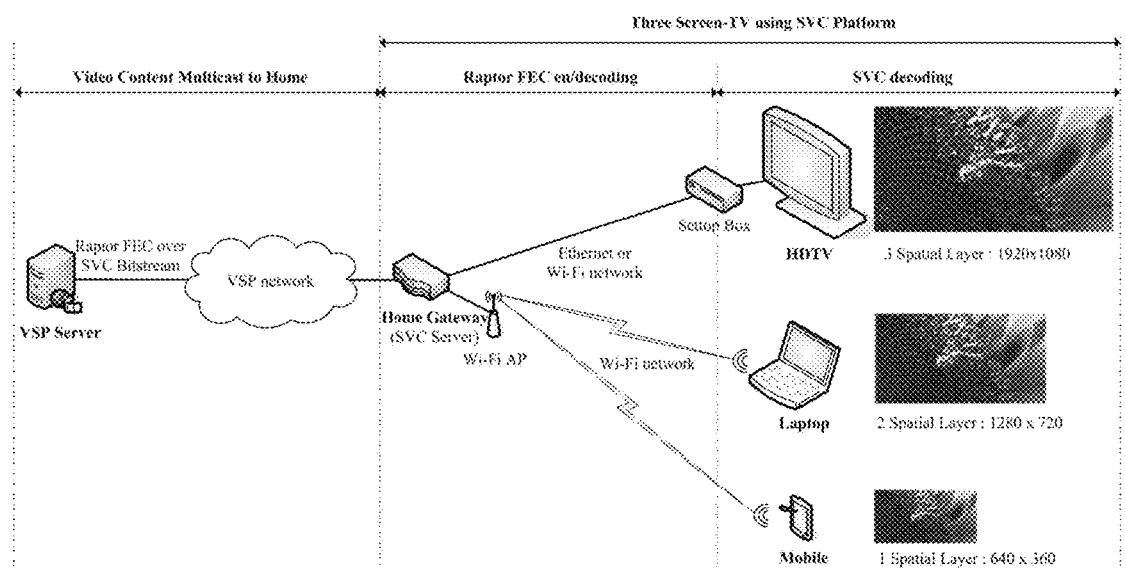
FIG. 3 is a diagram illustrating a scalable video coding service according to an embodiment of the present invention.

FIG. 3 is a diagram illustrating a scalable video coding service according to an embodiment of the present invention.

The scalable video coding service according to an embodiment of the present invention is an image compression method for providing various services in a scalable manner in terms of temporal, spatial, and image quality depending on various user environments such as network conditions or terminal resolution in various multimedia environments. Scalable video coding services generally provide scalability in terms of spatial resolution, quality, and temporal aspects.

Spatial scalability may be provided as service by encoding the same image with different resolution for each layer. It is possible to adaptively provide image contents to devices having various resolutions such as digital TV, notebook, and smart phone using spatial scalability.

Referring to the drawings, a scalable video coding service may support one or more TVs having different characteristics from a video service provider (VSP) through a home gateway in the home. For example, the scalable video coding service may simultaneously support High-Definition TV (HDTV), Standard-Definition TV (SDTV), and Low-Definition TV (LDTV) having different resolutions.

The temporal scalability may adaptively adjust the frame rate of an image in consideration of the network environment in which the content is transmitted or the performance of the terminal. For example, when using a local area network, service is provided at a high frame rate of 60 Frame Per Second (FPS) and when using a wireless broadband network such as a 3G mobile network, content is provided at a low frame rate of 16 FPS, so that the service may be provided to allow the user to receive the image without interruption. Depending on the quality scalability, network environment or terminal performance, various quality contents are serviced, thereby allowing the user to stably reproduce the image contents.

The scalable video coding service according to an embodiment of the present invention may include a base layer and at least one enhancement layer(s). The receiver may provide a normal image quality only when the base layer is received, and may provide high image quality when the base layer and enhancement layer are received together. That is, when there is a base layer and one or more enhancement layers, as receiving more enhancement layers (e.g., enhancement layer 1, enhancement layer 2, . . . , enhancement layer n) while receiving the base layer, the image quality and the quality of the provided image are improved.

In this way, since the image of the scalable video coding service according to the embodiment of the present invention is composed of a plurality of layers, the receiver may receive a small amount of base layer data quickly, and may increase the quality of service by receiving additional enhancement layer image data if necessary.

Figure 4:
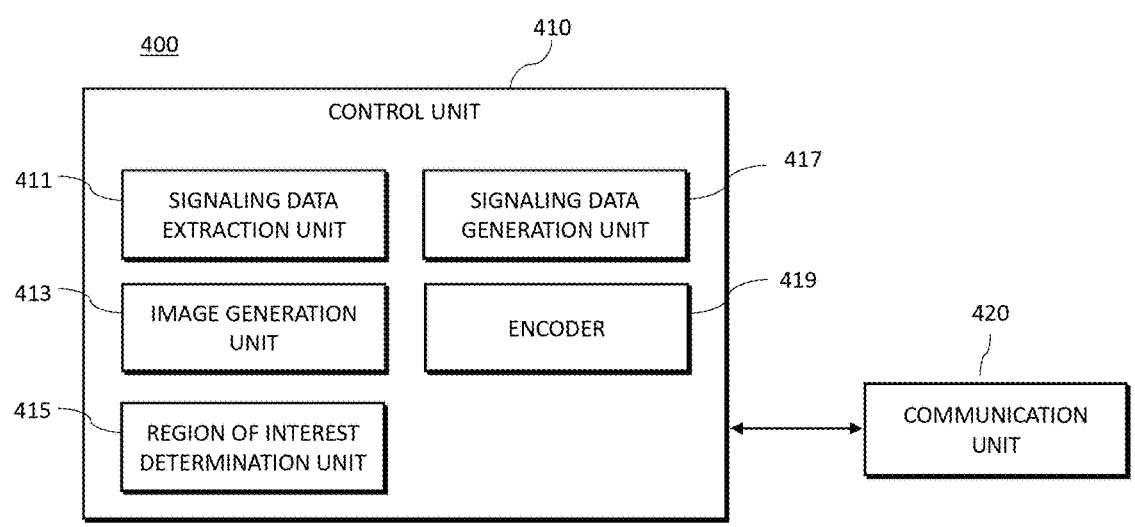
FIG. 4 is a diagram illustrating a configuration of a server device according to an embodiment of the present invention.

FIG. 4 is a diagram illustrating a configuration of a server device according to an embodiment of the present invention.

The server device 400 according to an embodiment of the present invention may include a control unit 410 and/or a communication unit 420.

The control unit 410 may generate a full image for a video conference in the virtual space and encode the generated full image. In addition, the control unit 410 may control all operations of the server device 400. Details will be described below.

The communication unit 420 may transmit and/or receive data to/from external devices and/or client devices. For example, the communication unit 420 may receive user data and/or signaling data from at least one client device. Also, the communication unit 420 may transmit a full image for the video conference to the client device in the virtual space.

The control unit 410 includes at least one of a signaling data extraction unit 411, an image generation unit 413, a region of interest determination unit 415, a signaling data generation unit 417, and/or an encoder 419.

The signaling data extraction unit 411 may extract the signaling data from the data received from the client device. For example, the signaling data may include image configuration information. The image configuration information may include gaze information indicating the gaze direction of the user in the virtual space and zoom region information indicating the viewing angle of the user.

The image generation unit 413 may generate a full image for a video conference in a virtual space based on the image received from at least one client device.

The region of interest determination unit 417 may determine the region of interest corresponding to the gaze direction of the user in the entire region of the virtual space for the video conferencing service. For example, the region of interest determination unit 417 may determine the region of interest based on the gaze information and/or the zoom region information. For example, the region of interest may be a location (e.g., a location where a new enemy appears in a game or the like, and the position of a speaker in a virtual space) of a tile where an important object is to be located in a virtual space viewed by the user and/or the user gazes. In addition, the region of interest determination unit 417 may generate the region of interest information indicating a region of interest corresponding to the gaze direction of the user in the entire region of the virtual space for the video conferencing service.

The signaling data generation unit 413 may generate signaling data for processing a full image. For example, the signaling data may transmit the region of interest information. The signaling data may be transmitted through at least one of Supplement Enhancement Information (SEI), video usability information (VUI), Slice Header, and a file describing video data.

The encoder 419 may encode the full image based on the signaling data. For example, the encoder 419 may encode the full image in a customized manner for each user based on the gaze direction of each user. For example, when the first user looks at the second user in the virtual space, the encoder may encode the image corresponding to the second user in high image quality and the image corresponding to the third user in low image quality based on the first user gaze in the virtual space. According to an embodiment, the encoder 419 may include at least one of the signaling data extraction unit 411, the image generation unit 413, the region of interest determination unit 415, and/or the signaling data generation unit 417.

Figure 5:
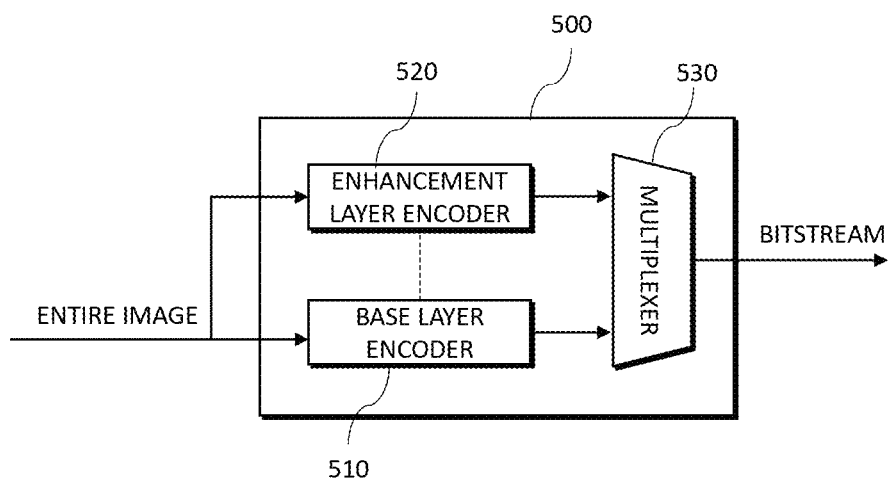
FIG. 5 is a diagram illustrating a structure of an encoder according to an embodiment of the present invention.

FIG. 5 is a diagram illustrating a structure of an encoder according to an embodiment of the present invention.

The encoder (e.g., image encoding device) 500 according to an embodiment of the present invention may include at least one of a base layer encoder 510, at least one enhancement layer encoder 520, and a multiplexer 530.

The encoder 500 may encode the full image using a scalable video coding method. The scalable video coding method may include Scalable Video Coding (SVC) and/or Scalable High Efficiency Video Coding (SHVC).

The scalable video coding method is an image compression method for providing various services in a scalable manner in terms of temporal, spatial, and image quality depending on various user environments such as network conditions or terminal resolution in various multimedia environments. For example, for the same video image, the encoder 500 may encode images of two or more different qualities (or resolutions, or frame rates) to generate a bitstream.

For example, the encoder 500 may use inter-layer prediction tools, which are encoding methods using intra-layer redundancy, in order to enhance the compression performance of a video image. The inter-layer prediction tool is a technique for enhancing the extrusion efficiency in the enhancement layer (Enhancement Layer) by eliminating redundancy of images existing between layers.

The enhancement layer may be encoded by referring to information of a reference layer using an inter-layer prediction tool. A reference layer is a lower layer that is referred to when encoding an enhancement layer. Here, since there is a dependency between layers by using an inter-layer tool, in order to decode the highest-layer image, a bit stream of all the lower layers is required. In the middle layer, decoding may be performed by obtaining only a bitstream of a layer to be decoded and its lower layers. The bitstream of the lowest layer is base layer and may be encoded by an encoder such as H.264/AVC, HEVC, or the like.

The base layer encoder 510 may encode a full image to generate base layer video data (or base layer bitstream) for the base layer. For example, the base layer video data may include video data for the entire area viewed by the user in the virtual space. The image of the base layer may be the image of the lowest quality.

The enhancement layer encoder 520 encodes the full image based on signaling data (e.g., region of interest information) and base layer video data so that it may generate at least one enhancement layer video data (or enhancement layer bitstream) for at least one enhancement layer predicted from the base layer. The enhancement layer video data may include video data for a region of interest within the entire region.

The multiplexer 530 may multiplex base layer video data, at least one enhancement layer video data, and/or signaling data, and may generate one bitstream corresponding to a full image.

Figure 6:
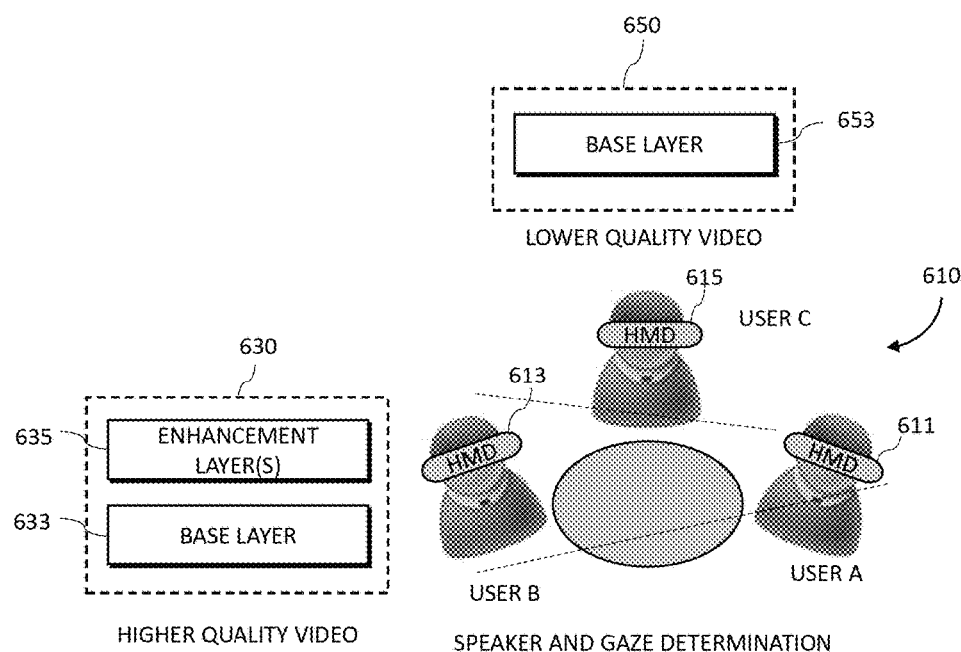
FIG. 6 is a diagram illustrating a video conferencing service using scalable video coding according to an embodiment of the present invention.

FIG. 6 is a diagram illustrating a video conferencing service using scalable video coding according to an embodiment of the present invention.

The client device receives a full image as a compressed video bitstream, decodes it, and renders as much as the area viewed by the user in a virtual space. Since the conventional technique transmits and/or receives a full image (for example, a 360-degree immersive image) as a high-resolution (or high-quality) image, the total bandwidth of a bit stream having a high resolution image is very large.

A server device according to an embodiment of the present invention may solve the above problems using a scalable video coding method. Hereinafter, an embodiment of the present invention for solving the above problems will be described in detail.

The first user 611, the second user 613, and the third user 615 may exist in the virtual space 610. The first user 611, the second user 613, and the third user 615 may perform a conference within the virtual space region 610.

The client device (not shown) may determine the speaker and the user's gaze in the virtual space, and generate image configuration information. When the client device first generates the image configuration information or when the user's gaze does not face the speaker, it may transmit image configuration information to the server device and/or other client devices.

A server device (not shown) may receive video and signaling data from at least one client device and may generate a full image for the virtual space 610.

Then, the server device may encode at least one video image based on the signaling data. The server device encodes the quality of the video image (or the region of interest) corresponding to the gaze direction and the quality of the video image not corresponding to the gaze direction differently based on the image configuration information (for example, gaze information and medium region information). For example, a server device may encode a video image corresponding to a user's gaze direction with high quality and a video image that does not correspond to a user's gaze direction with a low quality.

Referring to the drawing, the first video image 630 is a video image of a region of interest corresponding to the gaze direction of the first user 611. The first video image 630 needs to be provided to the first user 611 with high quality. Thus, the server device may encode the first video image 630, generate base layer video data 633, and generate at least one enhancement layer video data 635 using inter-layer prediction.

The second video image 650 is a video image of a region of non-interest that does not correspond to the gaze direction of the first user 611. The second video image 650 needs to be provided to the first user 611 with a low quality. Thus, the server device may encode the second video image 650 to generate only the base layer video data 653.

Then, the server device may transmit the encoded at least one bitstream to the client device used by the first user 611.

In conclusion, if the first user 611 views only the second user 613 or if the third user 615 occupies only a very small area within the viewing angle of the first user 611, the server device may transmit the video of the second user 613 as base layer video data and at least one enhancement layer video data in scalable video coding. In addition, the server device may transmit only the base layer video data to the third user 615.

Figure 7:
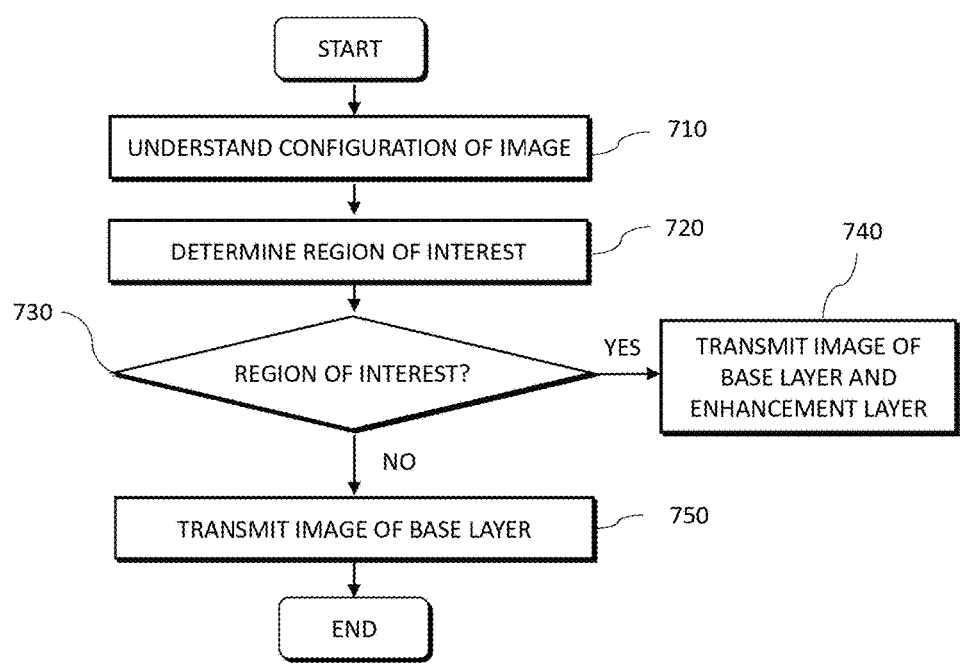
FIG. 7 is a diagram illustrating an image transmission method according to an embodiment of the present invention.

FIG. 7 is a diagram illustrating an image transmission method according to an embodiment of the present invention.

The server device may receive video image and signaling data from at least one client device using a communication unit. Also, the server device may extract signaling data using a signaling data extraction unit. For example, the signaling data may include viewpoint information and zoom region information.

The gaze information may indicate whether the first user views the second user or the third user. If the first user views the direction of the second user within the virtual space, the gaze information may indicate the direction from the first user to the second user.

The zoom region information may indicate an enlarged range and/or a reduced range of the video image corresponding to the gaze direction of the user. Also, the zoom region information may indicate the viewing angle of the user. If the video image is enlarged based on the value of the zoom region information, the first user may view only the second user. If the video image is reduced based on the value of the zoom region information, the first user may view part and/or all of the third user as well as the second user.

Then, the server device may use the image generation unit to generate a full image for the video conference in the virtual space.

Then, the server device may understand the image configuration information on the viewpoint that each user views and the zoom area in the virtual space based on the signaling data using the region of interest determination unit 710.

Then, the server device may determine the region of interest of the user based on the image configuration information using the region of interest determination unit 720.

When the first user views the second user, the video image corresponding to the gaze direction of the first user may occupy a large area of the second user, and the third user may occupy a small area or may not be included in the video image. In this case, the region of interest may be a region including the second user. The region of interest may be changed according to the gaze information and the zoom region information.

If the signaling data (e.g., at least one of viewpoint information and zoom region information) is changed, the server device may receive new signaling data. In this case, the server device may determine a new region of interest based on the new signaling data.

Then, the server device may use the control unit to determine whether the data currently processed based on the signaling data is data corresponding to the region of interest.

When the signaling data is changed, the server device may determine whether the data currently processed based on the new signaling data is data corresponding to the region of interest.

In case of data corresponding to a region of interest, the server device may encode a video image (for example, a region of interest) corresponding to a user's viewpoint with a high quality using the encoder 740. For example, the server device may generate base layer video data and enhancement layer video data for the video image and transmit them.

When the signaling data is changed, the server device may transmit a video image (new region of interest) corresponding to a new viewpoint as a high-quality image. In the case where the server device is transmitting a low-quality image but the signaling data is changed and the server device transmits a high-quality image, the server device may additionally generate and/or transmit enhancement layer video data.

In the case of data not corresponding to a region of interest, the server device may encode a video image (for example, a region of non-interest) not corresponding to a user's viewpoint with a low quality (750). For example, the server device may generate only base layer video data for video images not corresponding to the user's viewpoint and transmit them.

When the signaling data is changed, the server device may transmit a video image (new region of non-interest) not corresponding to a new viewpoint as a low-quality image. In the case where the server device is transmitting a high-quality image but the signaling data is changed and the server device transmits a low-quality image, the server device may no longer generate and/or transmit at least one enhancement layer video data, and may generate and/or transmit only base layer video data.

That is, since the video quality of the base layer video data is lower than the video quality of the enhancement layer video data, when the user obtains information from the sensor or the like, the client device may receive enhancement layer video data for a video image (e.g., region of interest) corresponding to the gaze direction of the user. Then, the client device may provide the user with a high-quality video image in a short time.

The method according to an embodiment of the present invention has more advantages compared to a simple pre-caching method of receiving only data of a partially added region in advance or a method of receiving only data of a region corresponding to a user's gaze direction.

The method according to an embodiment of the present invention may lower the overall bandwidth as compared with the conventional method of transmitting all the data with high image quality.

In addition, the method according to an embodiment of the present invention may respond to user gaze motion in real time to increase the speed of video processing.

When the first user looks at the second user and turns his head to the third user, the conventional method understands this motion with a client device (e.g., a sensor of the HMD), processes video information for representing a third user, and reproduces the video on the screen. Since the conventional method is very difficult to process a new area image very quickly, the existing method used an inefficient method of receiving all the data in advance.

However, since the present invention performs adaptive video transmission through the scalable video, when the first user turns his head to the third user, it may quickly respond to the user using the base layer data already possessed. One embodiment of the present invention may reproduce video images faster than when processing the entire high resolution data. Thus, one embodiment of the present invention is able to process video images in a fast response to gaze motion.

Figure 8:
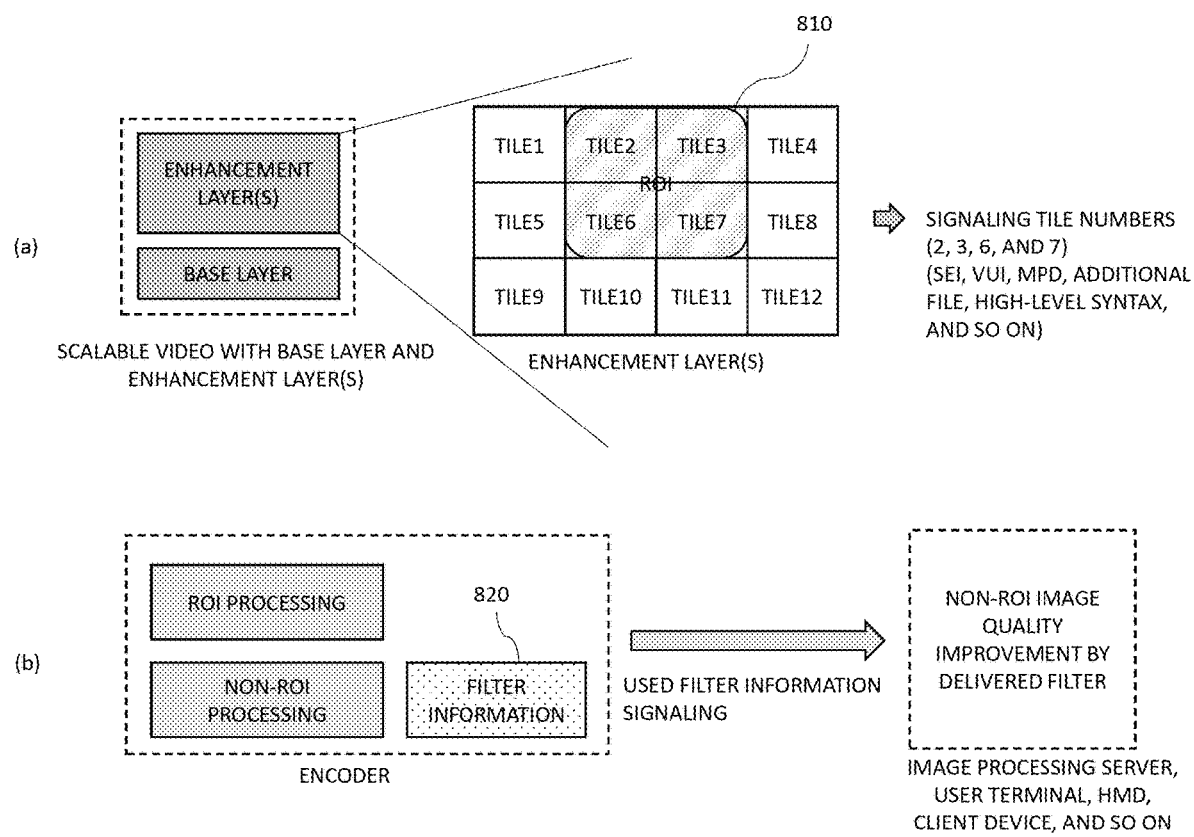
FIG. 8 is a diagram illustrating a method of signaling a region of interest according to an embodiment of the present invention.

FIG. 8 is a diagram illustrating a method of signaling a region of interest according to an embodiment of the present invention.

Referring to FIG. 8(*a*), it shows a method of signaling a region of interest in scalable video according to an embodiment of the present invention.

A server device (or an encoder) according to an embodiment of the present invention may divide one video image (or picture) into a plurality of tiles having a rectangular shape. For example, a video image may be divided with Coding Tree Unit (CTU). For example, one CTU may include Y CTB, Cb CTB, and Cr CTB.

The server device may encode the video image of the base layer as a whole without dividing into a tile for fast user response. Then, the server device may divide part or all of a video image of one or more enhancement layers into a plurality of tiles and encode them, as needed.

That is, the server device may divide the video image of the enhancement layer into at least one tile and encode tiles corresponding to the region of interest (ROI) 810.

At this time, the region of interest 810 may correspond to a location (e.g., a location where a new enemy appears in a game or the like, and the position of a speaker in a virtual space) of tiles where an important object to be viewed by the user is to be located in a virtual space and/or the user gazes.

In addition, the server device may generate region of interest information including tile information identifying at least one tile included in the region of interest. For example, the region of interest information may be generated by a region of interest determination unit, a signaling data generation unit, and/or an encoder.

Since the tile information of the region of interest 810 is continuous, it may be effectively compressed even without the numbers of all the tiles. For example, the tile information may include not only the numbers of all the tiles corresponding to the region of interest but also the beginning and ending numbers of the tiles, the coordinate point information, the Coding Unit (CU) number list, and the tile number expressed by the formula.

The tile information of a region of non-interest may be transmitted to another client device, image processing computing device, and/or server after entropy coding provided by the encoder.

The region of interest information may be delivered through a high-level syntax protocol that carries Session information. In addition, the region of interest information may be transmitted in packet units such as Supplement Enhancement Information (SEI), video usability information (VUI), and slice header of a video standard. In addition, the region of interest information may be delivered as a separate file describing the video file (e.g., MPD in DASH).

The video conferencing system according to an embodiment of the present invention transmits and/or receives only the necessary tiles of the enhancement layer between the client devices and/or the client device and the server device through signaling of the region of interest information, so that it is possible to lower overall bandwidth, and reduce video processing time. This is important to ensure fast HMD user response time.

Referring to FIG. 8(*b*), it shows a method of signaling a region of interest in a single-screen video according to an embodiment of the present invention.

In single-screen video rather than scalable video, an embodiment of the present invention may use a method of downscaling (or downsampling) a region other than a region of interest (ROI). The prior art does not share the filter information 820 used for downscaling between the terminals using the service, but makes an appointment from the beginning with only one technique, or only the encoder knows the filter information.

However, in order to improve even the image quality of the downscaled region other than the region of interest in the client device (or the HMD terminal) which receives the encoded image, the server device according to an embodiment of the present invention may transmit the filter information 820 used in encoding to the client device. This technique may actually reduce image processing time significantly and may provide image quality enhancement.

As described above, the server device may generate region of interest information. For example, the region of interest information may further include filter information as well as tile information. For example, the filter information may include the number of promised filter candidates and the values used in the filter.

Figure 9:
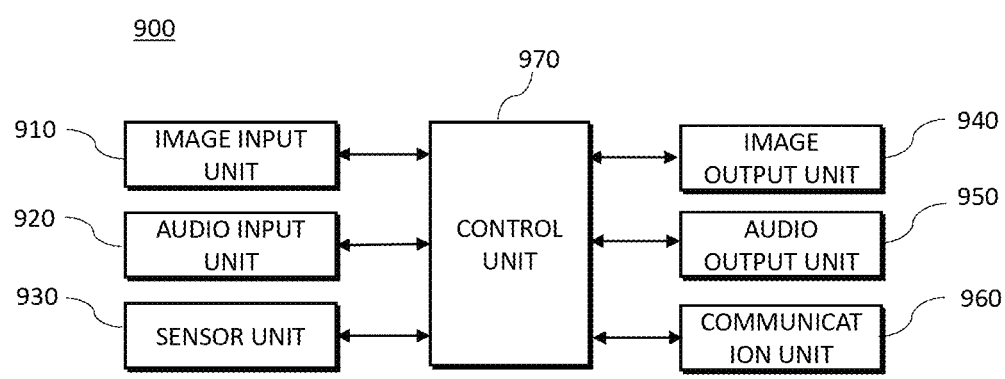
FIG. 9 is a diagram illustrating a configuration of a client device according to an embodiment of the present invention.

FIG. 9 is a diagram illustrating a configuration of a client device according to an embodiment of the present invention.

The client device 900 according to an embodiment of the present invention includes an image input unit 910, an audio input unit 920, a sensor unit 930, an image output unit 940, an audio output unit 950, a communication unit 960, and/or a control unit 970. For example, the client device 900 may be a Head Mounted Display (HMD). In addition, the control unit 970 of the client device 900 may be included in the client device 900 or may be a separate device.

The image input unit 910 may capture a video image. The image input unit 910 may include at least one of a 2D/3D camera and/or an immersive camera for obtaining a user's image. The 2D/3D camera may capture an image having a viewing angle of 180 degrees or less. The immersive camera may capture an image having a viewing angle of 360 degrees or less.

The audio input unit 920 may record the user's voice. For example, the audio input 920 may include a microphone.

The sensor unit 930 may obtain information on the movement of the user gaze. For example, the sensor unit 930 may include a gyro sensor for sensing a change in the azimuth of the object, an acceleration sensor for measuring the acceleration of the moving object or the intensity of the impact, and an external sensor for sensing the gaze direction of the user. According to an embodiment, the sensor unit 930 may include an image input unit 910 and an audio input unit 920.

The image output unit 940 may output image data received from the communication unit 960 or stored in a memory (not shown).

The audio output unit 950 may output the audio data received from the communication unit 960 or stored in a memory.

The communication unit 960 may communicate with external client devices and/or server devices through the broadcast network and/or broadband. For example, the communication unit 960 may include a transmission unit (not shown) for transmitting data and/or a reception unit (not shown) for receiving data.

The control unit 970 may control all operations of the client device 900. The control unit 970 may process the video data and the signaling data received from the server device. Details of the control unit 970 will be described below.

Figure 10:
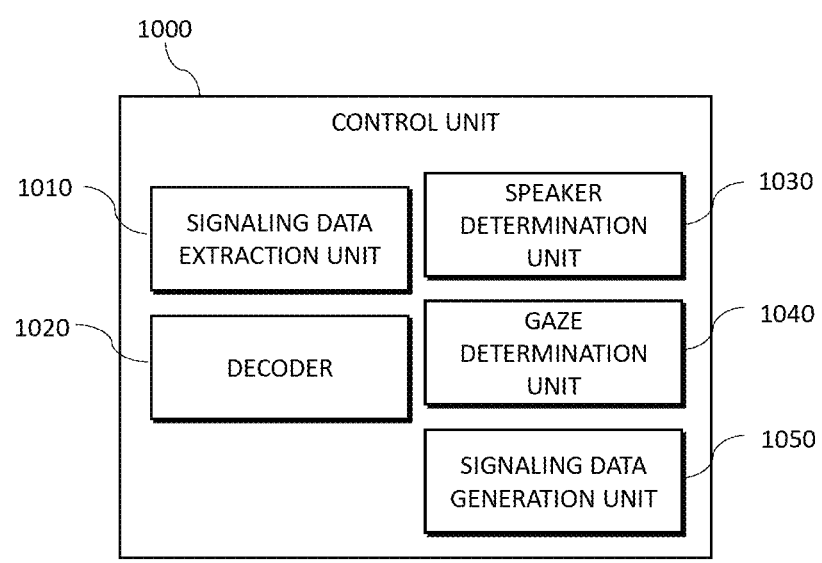
FIG. 10 is a diagram illustrating a configuration of a control unit according to an embodiment of the present invention.

FIG. 10 is a diagram illustrating a configuration of a control unit according to an embodiment of the present invention.

The control unit 1000 according to an embodiment of the present invention may process signaling data and/or video data. The control unit 1000 may include at least one of a signaling data extraction unit 1010, a decoder 1020, a speaker determination unit 1030, a gaze determination unit 1040, and/or a signaling data generation unit 1050.

The signaling data extraction unit 1010 may extract signaling data from data received from the server device and/or other client devices. For example, the signaling data may include region of interest information.

The decoder 1020 may decode the video data based on the signaling data. For example, the decoder 1020 may decode the full image in a customized manner for each user based on the gaze direction of each user. For example, when the first user looks at the second user in the virtual space, the decoder 1020 of the first user may decode the image corresponding to the second user in high image quality and the image corresponding to the third user in low image quality based on the first user gaze in the virtual space. According to an embodiment, the decoder 1020 may include at least one of the signaling data extraction unit 1010, the speaker determination unit 1030, the gaze determination unit 1040, and/or the signaling data generation unit 1050.

The speaker determination unit 1030 may determine who the speaker is within the virtual space based on the voice and/or given options.

The gaze determination unit 1040 may determine the user's gaze in the virtual space and generate image configuration information. For example, the image configuration information may include gaze information indicating the gaze direction and/or zoom region information indicating the viewing angle of the user.

The signaling data generation unit 1050 may generate signaling data for transmission to the server device and/or other client devices. For example, the signaling data may transmit image configuration information. The signaling data may be transmitted through at least one of Supplement Enhancement Information (SEI), video usability information (VUI), Slice Header, and a file describing video data.

Figure 11:
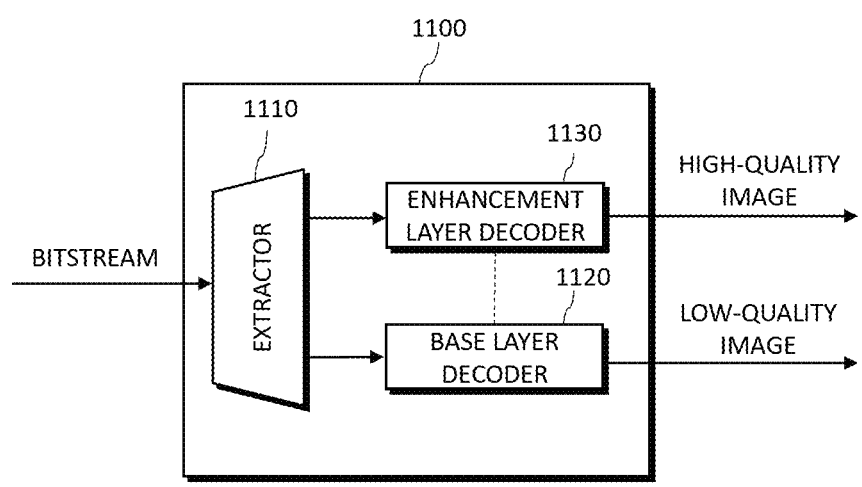
FIG. 11 is a diagram illustrating a configuration of a decoder according to an embodiment of the present invention.

FIG. 11 is a diagram illustrating a configuration of a decoder according to an embodiment of the present invention.

The decoder 1100 according to an embodiment of the present invention may include at least one of an extractor 1110, a base layer decoder 1120, and/or at least one enhancement layer decoder 1130.

The decoder 1100 may decode the bitstream (video data) using an inverse process of the scalable video coding method.

The extractor 1110 may receive the bitstream (video data) including the video data and the signaling data, and may selectively extract the bitstream according to the image quality of the image to be reproduced. For example, a bitstream (video data) may include a base layer bitstream (base layer video data) for a base layer and at least one enhancement layer bitstream (enhancement layer video data) for at least one enhancement layer predicted from a base layer. The base layer bitstream (base layer video data) may include video data for the entire area of the virtual space. At least one enhancement layer bitstream (enhancement layer video data) may include video data for a region of interest within the entire region.

Also, the signaling data may include region of interest information indicating a region of interest corresponding to the gaze direction of the user in the entire region of the virtual space for the video conferencing service.

The base layer decoder 1120 may decode a base layer bitstream (or base layer video data) for a low-quality image.

The enhancement layer decoder 1130 may decode at least one enhancement layer bitstream (or enhancement layer video data) for a high-quality image based on signaling data and/or base layer bitstream (or base layer video data).

Figure 12:
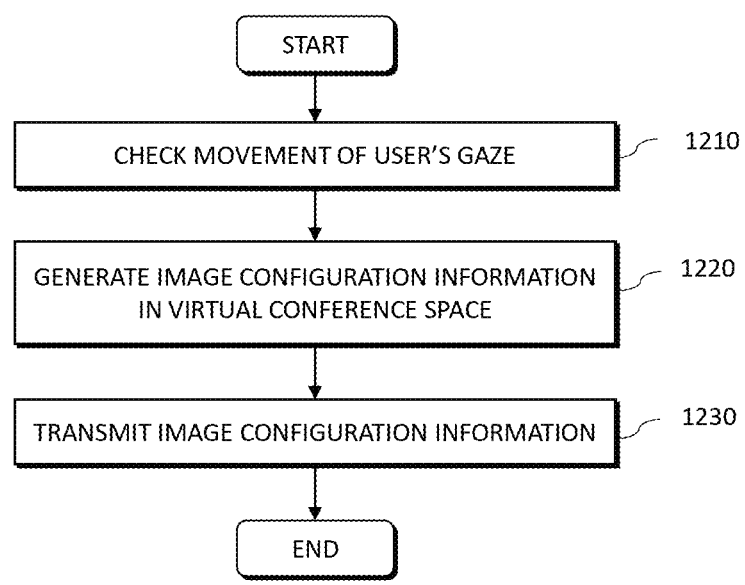
FIG. 12 is a diagram illustrating a method for generating and/or transmitting image configuration information according to an embodiment of the present invention.

FIG. 12 is a diagram illustrating a method for generating and/or transmitting image configuration information according to an embodiment of the present invention.

Hereinafter, a method of generating image configuration information for responding to a user gaze motion in real time will be described.

The image configuration information may include at least one of gaze information indicating the gaze direction of the user and/or zoom region information indicating the viewing angle of the user. The user gaze means the direction in which users gaze in virtual space rather than actual space. In addition, the gaze information may include information indicating the gaze direction of the user in the future (for example, information on the gaze point expected to be noticed) as well as information indicating the gaze direction of the current user.

The client device according to an embodiment of the present invention may sense an operation of looking at another user located in a virtual space around a user and process this.

The client device may receive sensing information from the sensor unit using a control unit and/or a gaze determination unit. The sensing information may be an image captured by a camera, or a voice recorded by a microphone. In addition, the sensing information may be data sensed by a gyro sensor, an acceleration sensor, and an external sensor.

Also, the client device may check the movement of the user gaze based on the sensing information using a control unit and/or a gaze determination unit (1210). For example, the client device may check the movement of the user gaze based on the change of the value of the sensing information.

In addition, the client device may generate image configuration information in the virtual conference space using a control unit and/or gaze determination unit (1220). For example, if the client device is physically moving or the user's gaze is moving, the client device may calculate the gaze information and/or the zoom region information of the user in the virtual meeting space based on the sensing information. Further, the client device may transmit the image configuration information to the server device and/or other client devices using a communication unit (1230). In addition, the client device may deliver the image configuration information as its other components.

In the above, a method of generating image configuration information by a client device is described. However, the present invention is not limited to this, and the server device may receive the sensing information from the client device and generate the image configuration information.

Figure 13:
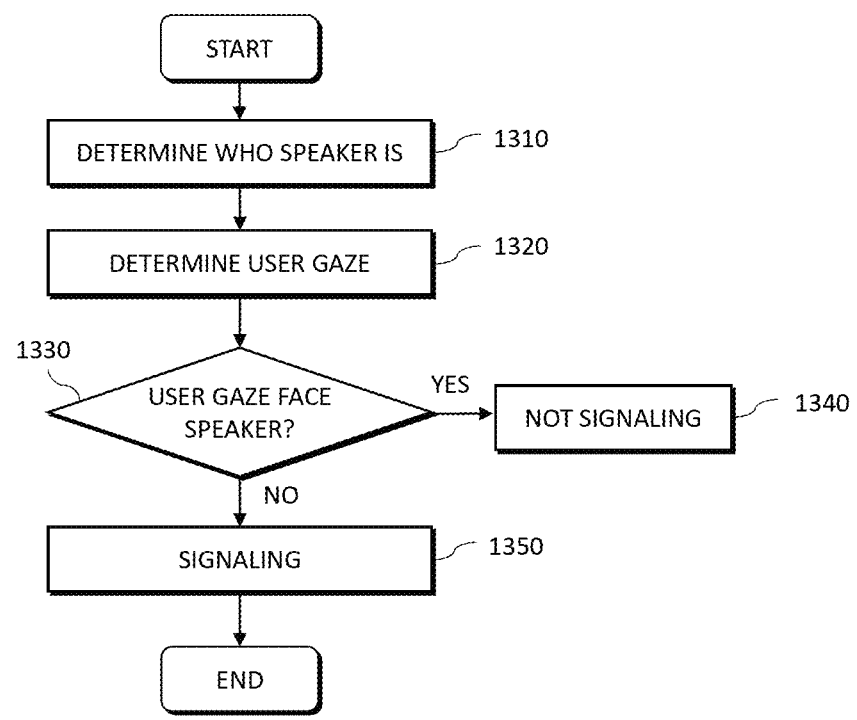
FIG. 13 is a diagram illustrating a method of signaling image configuration information by a client device according to an embodiment of the present invention.

In addition, an external computing device connected to the client device may generate image configuration information, and the computing device may deliver image configuration information to its client device, other client devices, and/or server devices. FIG. 13 is a diagram illustrating a method of signaling image configuration information by a client device according to an embodiment of the present invention.

Signaling the image configuration information (including viewpoint information and/or zoom region information) is very important. If the signaling of the image configuration information is too frequent, it may place a burden on the client device, the server device, and/or the entire network.

Accordingly, the client device according to an embodiment of the present invention may signal image configuration information only when the image configuration information (or gaze information and/or zoom region information) of the user is changed. That is, the client device may transmit the user's gaze information to another client device and/or server device only when the user's gaze information is changed.

In one embodiment, only when the speaker that speaks is different from the user's gaze direction using the fact that speakers are typically focused in most cases in a video conference, the gaze information may be signaled to another user's client device or server device. In the case of a user who is not a talking speaker but needs to be currently focused, such as performing currently (in the case of online lectures) or writing something on the board, the client device may obtain information on the speaker through options on the system (e.g., speaker and/or lecturer set to the second user). Referring to the drawing, a client device may determine who a speaker is in a virtual space area for a video conference using a control unit and/or a speaker determination unit (1310). For example, the client device may determine who the speaker is based on the sensing information. Also, the client device may determine who the speaker is according to the given option.

Then, the client device may determine a user's gaze using a control unit and/or a gaze determination unit (1320). For example, a client device may generate image configuration information based on a user's gaze using a control unit and/or a gaze determination unit.

Then, the client device may use the control unit and/or the gaze determination unit to determine whether the user's gaze is facing the speaker (1330).

If the user's gaze faces the speaker, the client device may not signal the image configuration information using a communication unit (1340). In this case, the client device may continuously receive the image of the speaker in the user's gaze direction, and the image that is not in the user's gaze direction may be received at a low quality.

If the user's gaze does not face the speaker, the client device may signal the image configuration information using a communication unit (1350). For example, if the user's gaze initially faces the speaker but later is changed to somewhere else, the client device may signal image configuration information for the new gaze direction of the user. That is, the client device may transmit image configuration information for the new gaze direction to another client device and/or a server device. In this case, the client device may receive the image corresponding to the user's new gaze direction with high quality, and may receive the image (for example, the image corresponding to the speaker) not corresponding to the user's new gaze direction with low quality.

In the above description, although it is mainly described that the client device generates and/or transmits image configuration information, the server device may receive the sensing information from the client device, generate the image configuration information based on the sensing information, and transmit the image configuration information to the at least one client device.

As described above, in a situation where users are all looking at a speaker at a video conference in a virtual space using a client device (e.g., HMD), the video conferencing system may transmit video information of speaker as scalable video data of base layer data and enhancement layer data. In addition, the video conferencing system receives signaling from a user who sees a user other than a speaker, and transmits the image information of another user as scalable video data of base layer data and enhancement layer data. Through this, the video conferencing system according to an embodiment of the present invention may provide quick and high-quality image information to the user while greatly reducing signaling on the entire system.

The above-mentioned signaling may be signaling between a server device, a client device, and/or an external computing device (if present). The above-mentioned signaling may be signaling between a server device, a client device, and/or an external computing device (if present).

Figure 14:
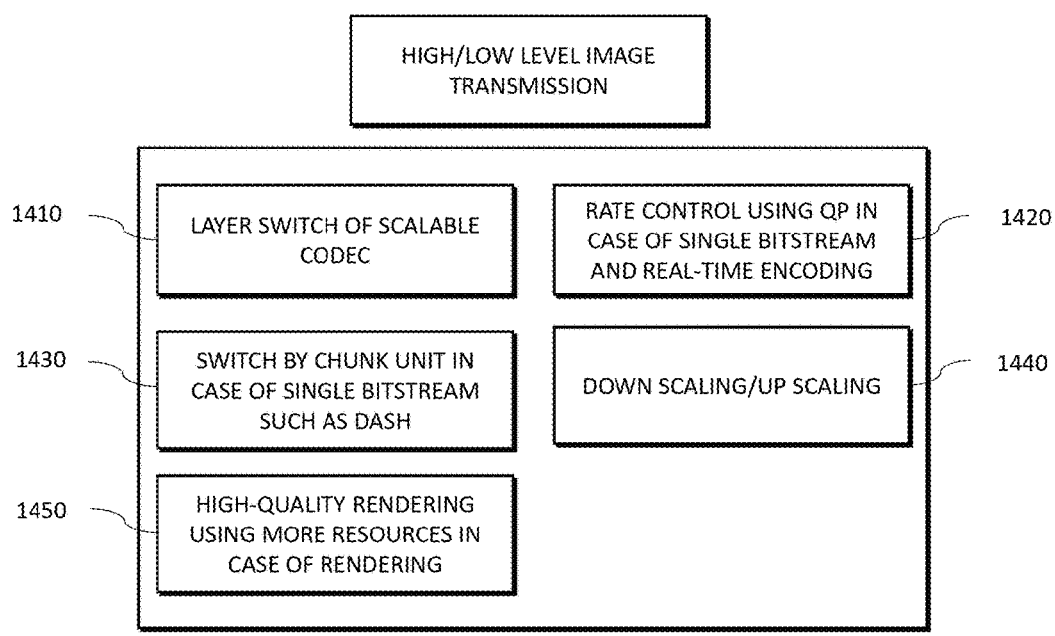
FIG. 14 is a diagram illustrating a method of transmitting a high/low level image according to an embodiment of the present invention.

FIG. 14 is a diagram illustrating a method of transmitting a high/low level image according to an embodiment of the present invention.

A method of transmitting a high/low level image based on a user's gaze information according to an embodiment of the present invention may include a method 1410 of switching a layer of a scalable codec, a rate control method 1420 using Quantization Parameter (QP) in case of single bit stream and real time encoding, a method 1430 of switching in units of chunks in the case of a single bit stream such as DASH, a Down Scaling/Up Scaling method 1440, and/or a high quality rendering method 1450 that utilizes more resources in the case of rendering. Although one embodiment of the present invention described above refers to a differential transmission scheme 1410 through scalable video, even when using a common video coding technique with a single layer, by adjusting the quantization coefficient 1420 (quantization Parameter) or the Down/Up scaling degree 1440, it is possible to provide advantages such as lowering overall bandwidth and quickly responding to user gaze movements. Also, when using files that are transcoded into bitstreams having various bitrates in advance, an embodiment of the present invention may switch between a high-level image and a low-level image in chunk units and provide it (1430).

In addition, although an embodiment of the present invention takes a video conferencing system as an example, an embodiment of the present invention may be equally applied to Virtual Reality (VR) and Augmented Reality (AR) games using an HMD. That is, all of the techniques for providing the region corresponding to the gaze that the user sees as a high-level image and signaling only when looking at a region or an object that is not expected to be viewed by a user may be identically applied to the example of the video conferencing system.

Figure 15:
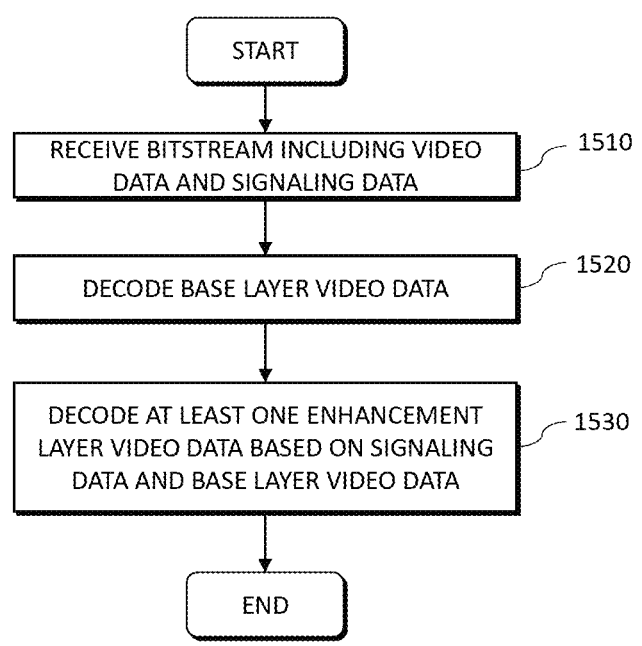
FIG. 15 is a diagram illustrating an image decoding method according to an embodiment of the present invention.

FIG. 15 is a diagram illustrating an image decoding method according to an embodiment of the present invention.

The image decoding device (or decoder) according to an embodiment of the present invention may include at least one of an extractor, a base layer decoder, and/or an enhancement layer decoder. Contents of the image decoding device and/or the image decoding method according to an embodiment of the present invention may include all relevant contents in the description of the server device and/or the image decoding device (or decoder).

The video decoding device may receive a bitstream including video data and signaling data using an extractor (1510). The image decoding device may extract signaling data, base layer video data, and/or at least one enhancement layer video data from the video data.

Also, the image decoding device may decode the base layer video data using a base layer decoder (1520).

The image decoding device may also decode at least one enhancement layer video data based on the signaling data and base layer video data using an enhancement layer decoder (1530).

For example, the video data may include the base layer video data for the base layer and the at least one enhancement layer video data for at least one enhancement layer predicted from the base layer.

Also, the signaling data may include region of interest information indicating a region of interest corresponding to the gaze direction of the user in the entire region of the virtual space for the video conferencing service.

Also, the base layer video data may include video data for the entire area, and at least one enhancement layer video data may include video data for the region of interest within the entire area.

Also, the at least one enhancement layer may be divided into at least one tile of a rectangular shape for each layer, and the region of interest information may include tile information identifying at least one tile included in the region of interest.

In addition, the region of interest information is generated based on the image configuration information, and the image configuration information may include gaze information indicating the gaze direction of the user and zoom region information indicating the viewing angle of the user in the virtual space.

Also, the image configuration information may be signaled when the gaze direction of the user is not facing the speaker.

In addition, the signaling data may be transmitted through at least one of Supplement Enhancement Information (SEI), video usability information (VUI), Slice Header, and a file describing the video data.

Figure 16:
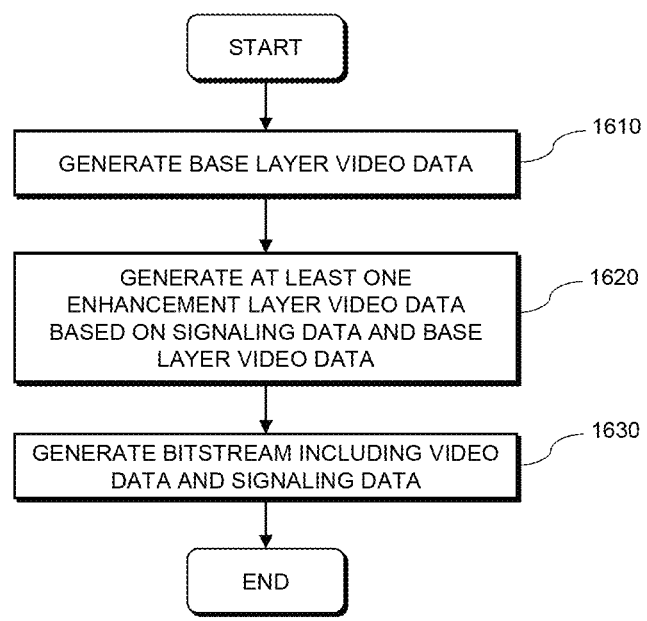
FIG. 16 is a diagram illustrating an image encoding method according to an embodiment of the present invention.

FIG. 16 is a diagram illustrating an image encoding method according to an embodiment of the present invention.

The image encoding device (or encoder) according to an embodiment of the present invention may include at least one of a base layer encoder, an enhancement layer encoder, and/or a multiplexer. Contents of the image encoding device and/or the image encoding method according to an embodiment of the present invention may include all relevant contents in the description of the server device and/or the image encoding device (or encoder).

The image encoding device may generate base layer video data using a base layer encoder (1610).

Also, the image encoding device may generate at least one enhancement layer video data based on signaling data and base layer video data using an enhancement layer encoder.

Further, the image encoding device may generate a bitstream including video data and signaling data using a multiplexer.

The image encoding device and/or image encoding method according to an embodiment of the present invention may perform an inverse process of the image decoding device and/or the image decoding method. Also, common features may be included for this purpose.

According to an embodiment of the present invention, the above-mentioned method may be implemented as processor readable codes on a medium having a program recorded thereon. Examples of the processor readable medium include ROM, RAM, CD-ROM, magnetic tape, floppy disk, and an optical data storage device and also include being implemented in the form of downloadable files.

The above-described electronic device is not limited to the application of the configurations and methods of the above-described embodiments and the entire or part of the embodiments may be selectively combined and configured to allow various modifications.

In the above, preferred embodiments of the present description are described with reference to the accompanying drawings. Here, the terms and words used in the present specification and claims should not be construed as limited to ordinary or dictionary terms, and should be construed in a sense and concept consistent with the technical idea of the present invention.

The scope of the present invention is not limited to the embodiments disclosed in the present specification, and the present invention may be modified, changed, or improved in various forms within the scope of the present invention.

What is claimed is:

1. An image decoding method comprising:
receiving a bitstream that includes video data and signaling data;
decoding base layer video data; and
decoding at least one enhancement layer video data based on the signaling data and the base layer video data,
wherein the video data comprises the base layer video data for a base layer and the at least one enhancement layer video data for at least one enhancement layer predicted from the base layer,
wherein the signaling data comprises region of interest information indicating a region of interest corresponding to a gaze direction of a user in an entire region of a virtual space for video conferencing service,
wherein the at least one enhancement layer video data is divided into multiple tiles,
wherein the region of interest information includes tile information identifying the multiple tiles included in the region of interest,
wherein the region of interest information is generated based on image configuration information, and the image configuration information comprises gaze information indicating the gaze direction of the user in the virtual space and zoom region information indicating a viewing angle of the user,
wherein the tile information is continuous, and
wherein the tile information includes numbers of all the tiles corresponding to the region of interest, beginning and ending numbers of the tiles, coordinate point information, a coding unit (CU) number list and a tile number expressed by the formula.

2. The method of claim 1, wherein the base layer video data comprises video data for the entire region, and the at least one enhancement layer video data comprises video data for the region of interest in the entire region.

3. The method of claim 1, wherein the image configuration information is signaled when the gaze direction of the user does not face a speaker.

4. The method of claim 1, wherein the signaling data is transmitted through at least one of a supplement enhancement information (SEI), a video usability information (VUI), a slice header, and a file describing the video data.

5. An image encoding method comprising:
generating base layer video data;
generating at least one enhancement layer video data based on signaling data and the base layer video data; and
generating a bitstream that includes video data and the signaling data,
wherein the video data comprises the base layer video data for a base layer and at least one enhancement layer video data for at least one enhancement layer predicted from the base layer,
wherein the signaling data comprises region of interest information indicating a region of interest corresponding to a gaze direction of a user in an entire region of a virtual space for video conferencing service,
wherein the at least one enhancement layer video data is divided into multiple tiles,
wherein the region of interest information includes tile information identifying the multiple tiles included in the region of interest, and
wherein the region of interest information is generated based on image configuration information, and the image configuration information comprises gaze information indicating the gaze direction of the user in the virtual space and zoom region information indicating a viewing angle of the user, wherein the tile information is continuous, and wherein the tile information includes numbers of all the tiles corresponding to the region of interest, beginning and ending numbers of the tiles, coordinate point information, a coding unit (CU) number list and a tile number expressed by the formula.

6. An image decoding device comprising:

an extractor configured to receive a bitstream including video data and signaling data;

a base layer decoder configured to decode base layer video data; and an enhancement layer decoder configured to decode at least one enhancement layer video data based on the signaling data and the base layer video data, wherein the video data comprises the base layer video data for a base layer and the at least one enhancement layer video data for at least one enhancement layer predicted from the base layer, wherein the signaling data comprises region of interest information indicating a region of interest corresponding to a gaze direction of a user in an entire region of a virtual space for video conferencing service, wherein the at least one enhancement layer video data is divided into multiple tiles, wherein the region of interest information includes tile information identifying the multiple tiles included in the region of interest, wherein the region of interest information is generated based on image configuration information, and the image configuration information comprises gaze information indicating the gaze direction of the user in the virtual space and zoom region information indicating a viewing angle of the user, wherein the tile information is continuous, and wherein the tile information includes numbers of all the tiles corresponding to the region of interest, beginning and ending numbers of the tiles, coordinate point information, a coding unit (CU) number list and a tile number expressed by the formula.

* * * * *